Aug. 23, 1949.　　　F. MARQUES ET AL　　　2,479,634
CLAMP
Filed Dec. 4, 1944
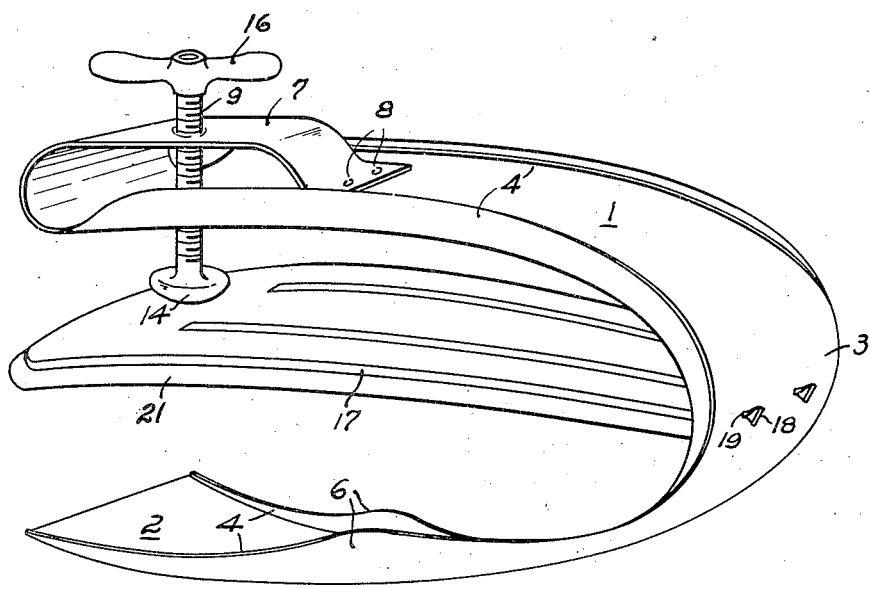
INVENTORS
Francisco Marques
Serop Odabashian
BY
Charles S. Evans
THEIR ATTORNEY Patented Aug. 23, 1949

2,479,634

UNITED STATES PATENT OFFICE 2,479,634

CLAMP

Francisco Marques and Serop Odabashian,
San Francisco, Calif.

Application December 4, 1944, Serial No. 566,622

2 Claims. (Cl. 24—243)

Our invention relates to a clamp designed for mounting upon automobile fenders and similar objects.

It is among the objects of our invention to provide a clamp which may be readily and effectively secured to a support such as a fender, running board, or other portion of an automobile, without marring the object, for providing a mooring and for similar purposes.

Another object is to provide a clamp of light, rigid construction facilitating manufacture and use.

A further object is to provide a clamp which may be applied in a wide variety of ways to various portions of an automobile to perform a variety of useful functions.

Our invention possesses other objects and features of value, some of which with the foregoing will be set forth in the following description of the invention. It is to be understood that we do not limit ourselves to the showing made by the said description and the drawings as we may adopt variant forms of the invention within the scope of the appended claims.

The drawing is a perspective view of a clamp embodying our invention.

In terms of broad inclusion, the clamp of our invention comprises a U-shaped body preferably formed of sheet metal and arranged to fit over a fender, running board or other portion of an automobile. A tongue disposed between the arms of the body is actuated by a screw to apply clamping pressure upon an object to which the clamp is applied. The tongue is pivoted to the back of the U-shaped body, and is provided with a resilient pad upon the side which engages the object.

In terms of greater detail, the clamp of our invention comprises a U-shaped body having an upper arm 1 and lower arm 2 joined by a back portion 3. The body is preferably formed from sheet metal of a weight suitable for the service for which the clamp is intended. The body is shaped with flanges 4 along the edges of the arms to give strength and rigidity. Humps 6 are preferably formed upon the inwardly projecting flanges 4 of the lower arm 2, to aid in maintaining retaining engagement with the under side of an automobile fender, or other similar support, not shown.

An extension 7 upon the upper arm 1 is doubled back over the end of the arm with the main portion of the extension disposed in spaced parallel relation to the same. The extreme end of the extension is doubled back and shaped to extend into engagement with the outer surface of the arm 1 where it is secured by suitable securing means, such as rivets 8.

A clamp screw 9 is mounted near the end of the arm 1 to extend through the arm and doubled back extension 7, in threaded engagement with at least one of those parts. A simple and effective mounting for the screw may be made by pressing in the material from an opening in the extension to form an inwardly extending collar threaded to engage the screw. The inner end of the screw is provided with a rounded pressure applying head 14. A handle 16 is secured upon the outer end of the screw for advancing and retracting the screw through the clamp arm 1.

A tongue 17 is pivotally connected to the back 3 of the clamp and extends forwardly between the arms 1 and 2 to the free ends thereof. In the illustrated construction, the tongue is pivoted by means of extensions 18, upon the inner end of the tongue, extending through openings 19 in the back of the clamp, and twisted through about 90° to effect retaining engagement. Other forms of pivot may of course be substituted if desired. The tongue 17 is freely movable between the limits defined by the upper and lower arms 1 and 2. A pad 21 of rubber or similar material is secured upon the under surface of the tongue 17.

The clamp may be usefully applied in a variety of ways. For example, the clamp may be secured to a fender, running board, or other accessible portion of an automobile to provide a mooring for a rope for fastening objects in a desired location upon the vehicle. Thus, when it is desired to carry large objects such as furniture, on an automobile, clamps may be secured at suitable points upon the fenders, body, or running board of the vehicle, and ropes may be conveniently moored to the clamps for tying the object in place. In applying a clamp, pressure is applied by the screw 9 to clamp the fender or other support between the tongue 17 and arm 2. The pad 21 protects the outer surface from marring, and the humps 6 insure an effective retaining contact on the back of the support. Heavy loads may be safely moored to the clamps and their use obviates the risk of damage to door handles, and the headlight and other brackets commonly used for moorings.

The clamps are also useful for clamping objects directly against desired portions of an automobile or other support. For example, strips of lumber or other articles may be gripped either between the tongue 17 and a support to which the clamp is applied, or between the tongue 17 and the outer arm 1. Thus, in clamping a piece of lumber to the fenders of a machine, the piece may be inserted between the tongue 17 and arm 1 before the clamp is placed on the fender. Pressure applied by the screw 9 against the piece of lumber presses the tongue against the fender to hold the clamp in place while the lumber is held against the tongue. So used the pad 21 protects the finish of the fender, and insures an effective clamping engagement.

We claim:

1. A fender clamp for automobiles comprising a U-shaped body having upper and lower arms shaped to extend over the edge of a fender and lie adjacent the outer and inner surfaces thereof respectively, a tongue pivoted at its inner end to the back of the body, the tongue being arranged to overlie the outer surface of the fender and being freely movable relative to both arms of the body, and a screw threaded through the outer end of the upper arm and movable to engage the tongue adjacent its free outer end for applying clamping pressure thereagainst, humps upon the lower arm for engaging the under surface of the fender, and a pad upon the under surface of the tongue for engaging the outer surface of the fender.

2. A fender clamp for automobiles comprising a U-shaped sheet metal body having upper and lower arms shaped to extend over the edge of a fender and lie adjacent the outer and inner surfaces thereof respectively, flanges outwardly turned along the edges of the upper arm, flanges inwardly turned along the edges of the lower arm, a tongue pivoted to the back of the body in freely movable relation to both arms, humps upon the inwardly extending flanges positioned to effect retaining engagement with an edge portion of the fender, and a screw threaded through the outer end of the upper arm and movable to apply clamping pressure against the tongue adjacent its free end.

FRANCISCO MARQUES.
SEROP ODABASHIAN.

REFERENCES CITED

The following references are of record in the file of this patent:

UNITED STATES PATENTS

| Number | Name | Date |
| --- | --- | --- |
| 834,849 | Rollman | Oct. 30, 1906 |
| 1,189,098 | Hall | June 27, 1916 |
| 1,204,075 | Sarphie | Nov. 7, 1916 |
| 1,233,223 | Hachmann | July 10, 1917 |
| 1,262,519 | Kline | Apr. 9, 1918 |